(12) United States Patent
Park (10) Patent No.: US 9,469,968 B2
(45) Date of Patent: Oct. 18, 2016

(54) APPARATUS AND METHOD FOR CONTROLLING WORK MACHINE OF WORK VEHICLE

(71) Applicant: Doosan Infracore Co., Ltd., Incheon (KR)

(72) Inventor: Kwang Seok Park, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/767,474

(22) PCT Filed: Feb. 5, 2014

(86) PCT No.: PCT/KR2014/000982
§ 371 (c)(1),
(2) Date: Aug. 12, 2015

(87) PCT Pub. No.: WO2014/126355
PCT Pub. Date: Aug. 21, 2014

(65) Prior Publication Data
US 2016/0002881 A1    Jan. 7, 2016

(30) Foreign Application Priority Data
Feb. 13, 2013 (KR) .................. 10-2013-0015264

(51) Int. Cl.
*E02F 9/20* (2006.01)
*E02F 3/43* (2006.01)

(52) U.S. Cl.
CPC .............. *E02F 9/2029* (2013.01); *E02F 3/43* (2013.01); *E02F 3/432* (2013.01); *G05B 2219/45012* (2013.01)

(58) Field of Classification Search
CPC .......... E02F 9/2029; E02F 3/43; E02F 3/432; G05B 2219/45012
USPC .......................................... 701/50
See application file for complete search history.

(56) References Cited

U.S. PATENT DOCUMENTS

| 8,657,083 B2* | 2/2014 | Vigholm | ............... E02F 9/2207 188/266.1 |
| 2008/0210505 A1* | 9/2008 | Vigholm | ............... E02F 9/2207 188/266.2 |

FOREIGN PATENT DOCUMENTS

| JP | 2001-200806 | 7/2001 |
| KR | 10-0198058 | 6/1999 |
| KR | 10-0227579 | 11/1999 |

(Continued)

OTHER PUBLICATIONS

Machine Translation KR 10-2008-0021276 published Mar. 2008.*

(Continued)

*Primary Examiner* — Anne M Antonucci
(74) *Attorney, Agent, or Firm* — K&L Gates LLP (57) ABSTRACT

An exemplary embodiment suggested in the present disclosure relates to an apparatus and a method of controlling a work machine of a work vehicle. The apparatus for controlling a work machine of a work vehicle suggested in the present disclosure measures a speed of a work vehicle, converts an input signal of a joystick into an output current for controlling a proportional valve (P/V) for operating a work machine (for example, a boom and a bucket), compares the speed of the work vehicle with a reference speed, and advances or delays an end time point or an operation time point of the work machine, thereby controlling an impact applied to the work vehicle.

7 Claims, 7 Drawing Sheets

(56) References Cited

FOREIGN PATENT DOCUMENTS

| KR | 10-0505349 | 9/2005 |
| KR | 10-2008-0021276 | 3/2008 |

OTHER PUBLICATIONS

International Search Report for International Patent Application PCT/KR2014/000982 mailed May 23, 2014. 5 pages.

* cited by examiner

FIG. 1

PRIOR ART

FIG. 2

PRIOR ART

APPARATUS AND METHOD FOR CONTROLLING WORK MACHINE OF WORK VEHICLE

CROSS REFERENCE TO RELATED APPLICATIONS

The present application is a National Stage of International Application No. PCT/KR2014/000982, filed on Feb. 5, 2014, which claims priority to Korean Patent Application No. 10-2013-0015264, filed on Feb. 13, 2013, the entire contents of each of which are being incorporated herein by reference.

TECHNICAL FIELD

The present disclosure relates to an apparatus and a method of controlling a work machine of a work vehicle for construction or civil engineering.

BACKGROUND ART

In general, a construction machine (construction vehicle) is used for civil-engineering work or construction work, and requires large power for an operation, so that a vehicle using hydraulic pressure is used. The kind of hydraulic work vehicle includes a wheel loader, an excavator, a grader, a crane, a conveying machine, and the like.

The wheel loader is a work vehicle used for digging up and moving earth and sand, aggregate, and the like in a civil-engineering work field. The wheel loader is dedicated equipment for repeatedly performing an operation of putting a workpiece into a front work machine (for example, a bucket of the wheel loader) according to an operation of a joystick by an operator while moving toward the workpiece (for example, earth and sand), moving to a truck or a target location, and dumping the workpiece of the work machine to a loading location.

Figure 1:
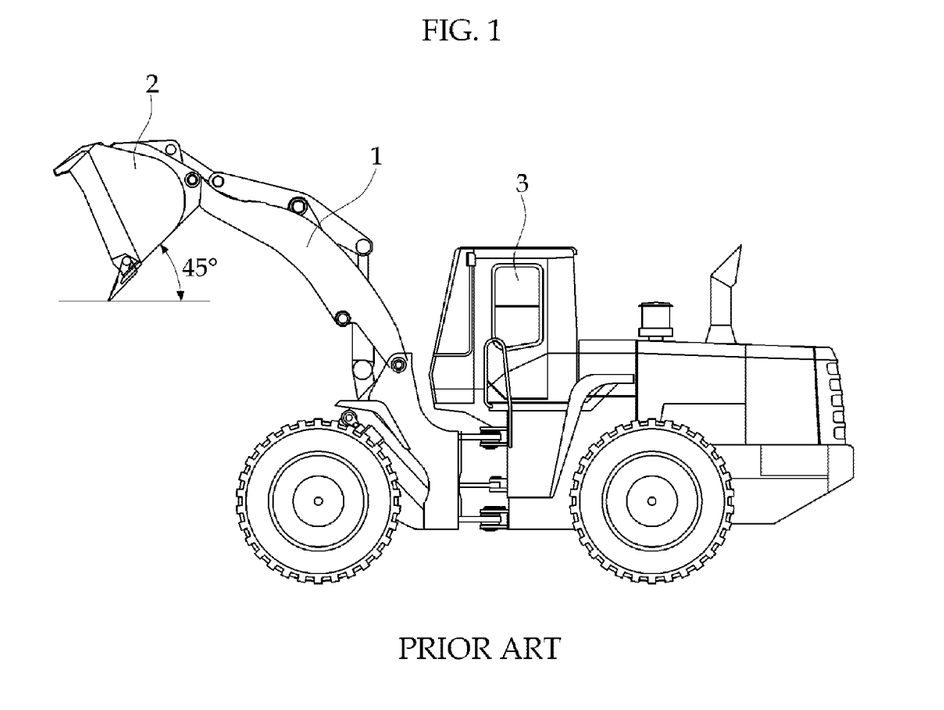
FIG. 1 is a diagram illustrating a wheel loader in the related art.

FIG. 1 is a diagram illustrating a wheel loader in the related art.

In general, in the wheel loader, a work machine is operated through a joystick. That is, a driver may operate the work machine by raising and floating a boom 1 while seated in a cabin 3, and further, may operate the work machine by crowding and dumping a bucket 2.

Figure 2:
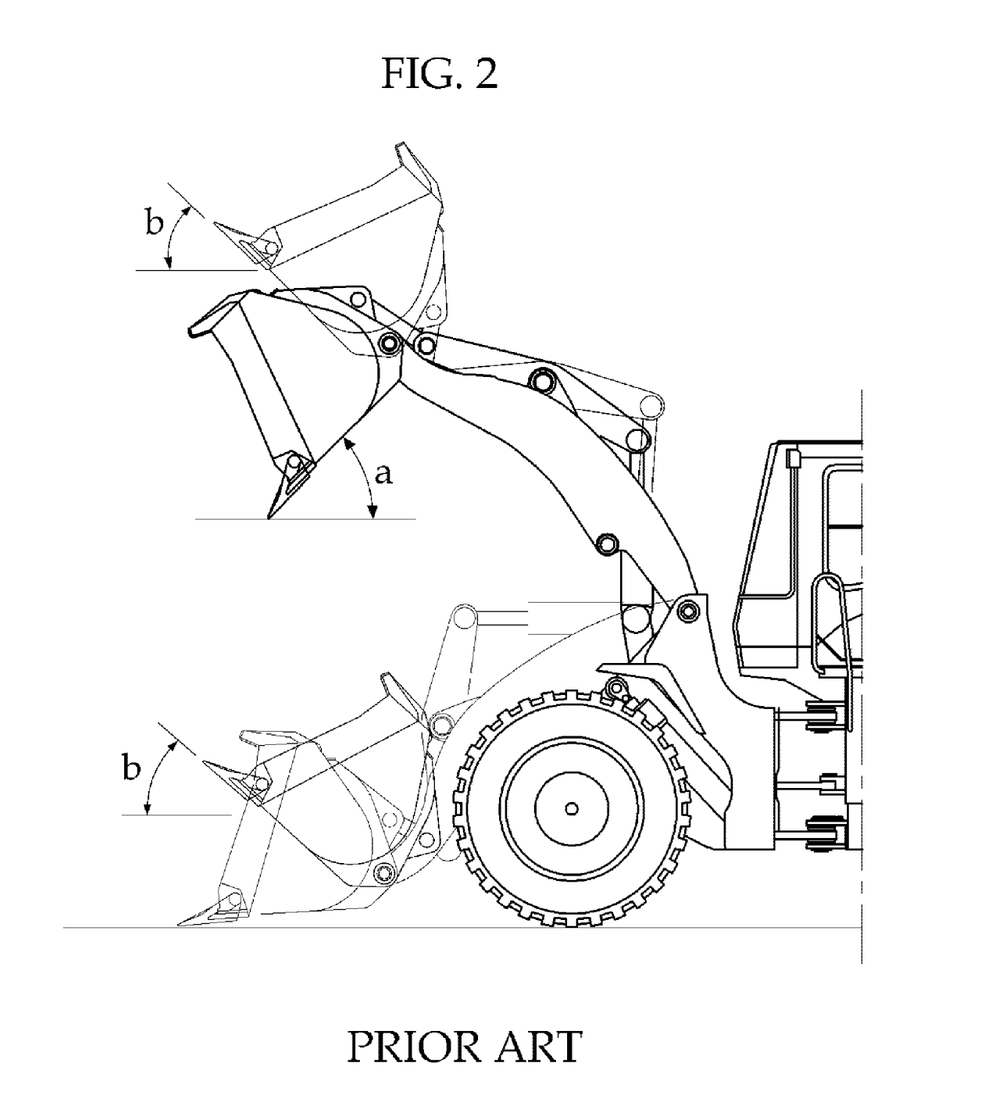
FIG. 2 is a diagram illustrating an operation range of a boom and a bucket of a general wheel loader.

FIG. 2 is a diagram illustrating an operation range of a boom and a bucket of a general wheel loader.

FIG. 2 illustrates a case where a boom 1 is at a raised position and a floated position, and a bucket 2 of the wheel loader is at a crowd position (that is, the bucket has an angle b in FIG. 2) and a dump position (that is, the bucket has an angle a in FIG. 2) at each position of the boom 1.

When work is performed by using the wheel loader, the boom 1 and the bucket 2 of the wheel loader are operated through a joystick of a main control valve (MCV), and further, a driver may move the wheel loader forwardly and backwardly by using a travelling device of the wheel loader during the operation. In general, the driver moves the wheel loader forwardly by using the travelling device, and raises and floats the boom 1 of the wheel loader and/or crowds and dumps the bucket 2 by operating the joystick. Particularly, there are many cases where the wheel loader changes a travelling direction from forward to backward or from backward to forward during the operation, and simultaneously operates the work machine (for example, the boom and the bucket of the wheel loader).

DISCLOSURE

Technical Problem

A work vehicle (for example, a wheel loader) simultaneously performs work and travelling according to a characteristic thereof. In this case, when a front work machine (for example, a boom and a bucket of a wheel loader) is operated while the work vehicle travels, an impact of the front work machine (for example, a conversion of an operation of the boom or the bucket, or a stop of an operation of the boom or the bucket) may influence the travelling vehicle. The impact of the front work machine may break a balance of the travelling vehicle and degrade work efficiency.

Accordingly, a technical object of the present disclosure to be solved is to adaptively and differently control the amount of impact and a control property of a front work machine according to a speed of a work vehicle when the work vehicle is travelling.

Technical Solution

In order to solve the technical problems of the present disclosure, an exemplary embodiment of the present disclosure provides an apparatus for controlling a work machine of a work vehicle, comprising: a speed sensor configured to measure a speed of a work vehicle; an electric main controller valve (EMCV) configured to convert an input signal of a joystick into an output current for controlling a proportional valve (P/V) for operating a work machine (for example, a boom and a bucket); and control unit configured to receive information on a speed of the work vehicle from the speed sensor, control an output current from the EMCV according to the speed of the work vehicle, and control an impact applied to the work machine while travelling.

The apparatus for controlling a work machine of a work vehicle suggested in the present disclosure measures a speed of a work vehicle, converts an input signal of a joystick into an output current for controlling a proportional valve (P/V) for operating a work machine (for example, a boom and a bucket), compares the speed of the work vehicle with a reference speed, and advances or delays an end time point of the work machine, thereby controlling an impact applied to the work vehicle.

Effects

According to the exemplary embodiments of the present disclosure, when a work vehicle performs an operation while travelling, it is possible to linearly change an end time point of a joystick by considering a speed of the work vehicle. That is, according to the exemplary embodiments of the present disclosure, it is possible to accurately and rapidly control a work machine when a work vehicle performs an operation while travelling at a low speed, but delay an operation of the work machine when the work vehicle performs an operation while travelling at a high speed, thereby decreasing the amount of impact applied to the work vehicle.

DETAILED DESCRIPTION OF CERTAIN INVENTIVE EMBODIMENTS

It should be noted that technical terms used in the present specification are used only to describe a specific exemplary embodiment, and do not intend to limit the present disclosure. Further, technical terms used in the present specification shall be interpreted as a meaning generally understood by those skilled in the art unless they are specially defined in the present specification in a different meaning, and shall not be construed in excessively general or narrow meanings. Further, when technical terms used in the present specification are improper technical terms, which fail to correctly express the spirit of the present disclosure, the technical terms shall be substituted with technical terms, which those skilled in the art may properly understand, to be understood. Further, a general term used in the present disclosure shall be construed according to a meaning defined in a dictionary or the context of a related description, and shall not be construed to have an excessively narrow meaning.

Further, the singular forms used in the present specification include the plural forms, unless the context clearly indicates otherwise. In the present application, it shall not be construed that terms, such as "including" or "comprising", various constituent elements or steps described in the specification need to be all essentially included, and it shall be construed that some constituent elements or steps among the various constituent elements or steps may be omitted, or additional constituent elements or steps may be further included.

Further, "module" and "unit" suffixes for components used in the present specification are given or mixed and used by considering only easiness in preparing a specification and do not have a meaning or role distinguished from each other in themselves.

Terms including ordinal numbers, such as "first" and "second", used in the present specification may be used for describing various constituent elements, but the constituent elements should not be limited by the terms. The terms are used only to discriminate one constituent element from another constituent element. For example, without departing from the scope of the present disclosure, the first constituent element may be referred to as the second component and similarly, the second constituent element is also referred to as the first constituent element.

Meanwhile, a term "and/or" described in the present disclosure includes a combination of a plurality of related items or any one items among the plurality of related items.

Hereinafter, an exemplary embodiment of the present disclosure will be described in detail with reference to the accompanying drawings, in which like reference numerals refer to like or similar constituent elements regardless of reference numerals and a duplicated description thereof will be omitted.

In describing the present disclosure, when it is determined that the detailed description of the known art related to the present disclosure may obscure the gist of the present disclosure, the detailed description thereof will be omitted. Further, it is noted that the accompanying drawings are used just for easily appreciating the spirit of the present disclosure and it should not be analyzed that the spirit of the present disclosure is limited by the accompanying drawings.

A basic concept of an exemplary embodiment suggested in the present disclosure is to adjust an output current curve according to an input of an electronic joystick operating a work machine according to a speed of a work machine (for example, a wheel loader), and when the work vehicle is travelling at a predetermined reference speed or higher, to soften a reaction of the work machine according to the input of the joystick to decrease an impact to the travelling work vehicle.

Figure 3:
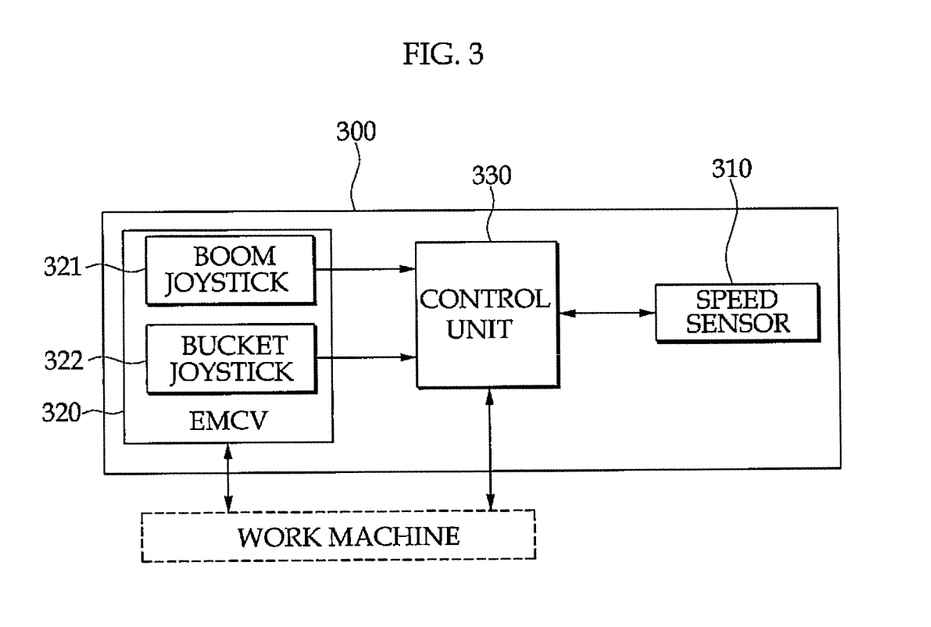
FIG. 3 is a block diagram illustrating an example of an apparatus for controlling a work machine of a work vehicle according to an exemplary embodiment of the present disclosure.

FIG. 3 is a block diagram illustrating an example of an apparatus for controlling a work machine of a work vehicle according to an exemplary embodiment of the present disclosure.

As illustrated in FIG. 3, an apparatus 300 for controlling a work machine of a work vehicle includes: a speed sensor 310 measuring a speed of the work machine; an electric main controller valve (EMCV) 320 for converting an input signal of a joystick into an output current for controlling a proportional valve (P/V) for operating the work machine (for example, a boom and a bucket); and a control unit 330 receiving information on a speed of the work vehicle from a speed sensor 310, controlling the output current from the EMCV 320 according to the speed of the work vehicle, and controlling an impact of the work machine while the work vehicle is travelling.

The EMCV 320 is a main controller valve (MCV) receiving an electronic joystick signal and controlling a current of the P/V. In the meantime, the MCV controls an operation of the work machine through a supply of hydraulic pressure to a cylinder or a work machine. The MCV may include a boom control valve and a bucket control valve, and in the boom control valve and the bucket control valve, an open degree of a valve is controlled according to a current applied from the control unit. Further, the boom control valve controls raising and floating operations of the boom, and the bucket control valve controls crowd and dump operations of the bucket.

The EMCV 320 may include a boom joystick 321 and a bucket joystick 322, and the boom joystick 321 is an input device for the raising and floating operations of the boom, and the bucket joystick 322 is an input device for the dump and crowd operation of the bucket.

Figure 4:
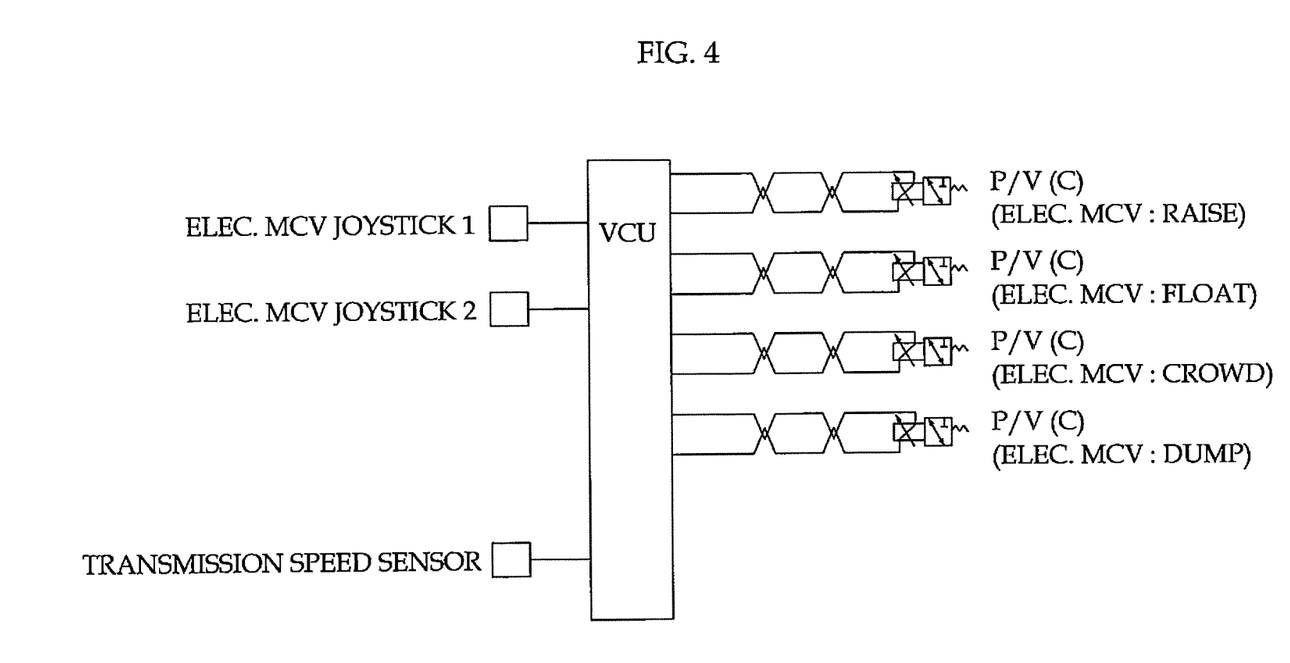
FIG. 4 is a circuit diagram illustrating an example of the apparatus for controlling a work machine of a work vehicle according to the exemplary embodiment of the present disclosure.

FIG. 4 is a circuit diagram illustrating an example of the apparatus for controlling a work machine of a work vehicle according to the exemplary embodiment of the present disclosure. However, FIG. 4 illustrates that the control unit is a vehicle control unit (VCU).

Figure 5:
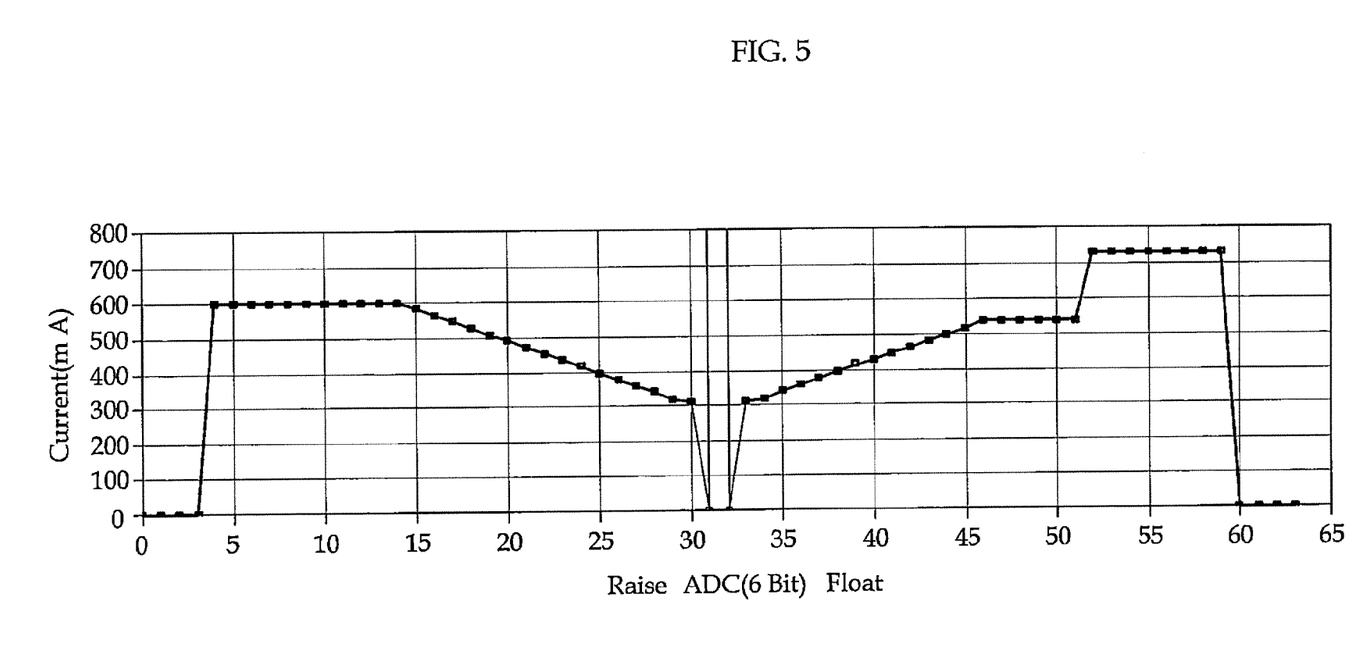
FIG. 5 is a graph illustrating an example of an output current according to an input of a joystick of an electronic main controller valve according to the exemplary embodiment of the present disclosure.

FIG. 5 is a graph illustrating an example of an output current according to an input of the joystick of the EMCV according to the exemplary embodiment of the present disclosure. FIG. 5 illustrates a corresponding current value according to a position of the joystick of the EMCV 320.

As illustrated in FIG. 5, a degree of opening of the P/V is adjusted according to X-axis input values of the joysticks 321 and 322. Input values of 31 to 32 of the joysticks 321 and 322 correspond to neutral values of the joysticks 321 and 322. That is, it can be recognized that an output current value is changed according to an operation of the joystick in up and down directions based on the input values of 31 to 32 of the joysticks 321 and 322. Further, in FIG. 5, a point, at which the input values of the joysticks 321 and 322 are 30, is a position at which the joysticks return to the neutral value (that is, 31 to 32 in FIG. 5). In this case, the output current values of the joysticks 321 and 322 are 320 mA.

Figure 6:
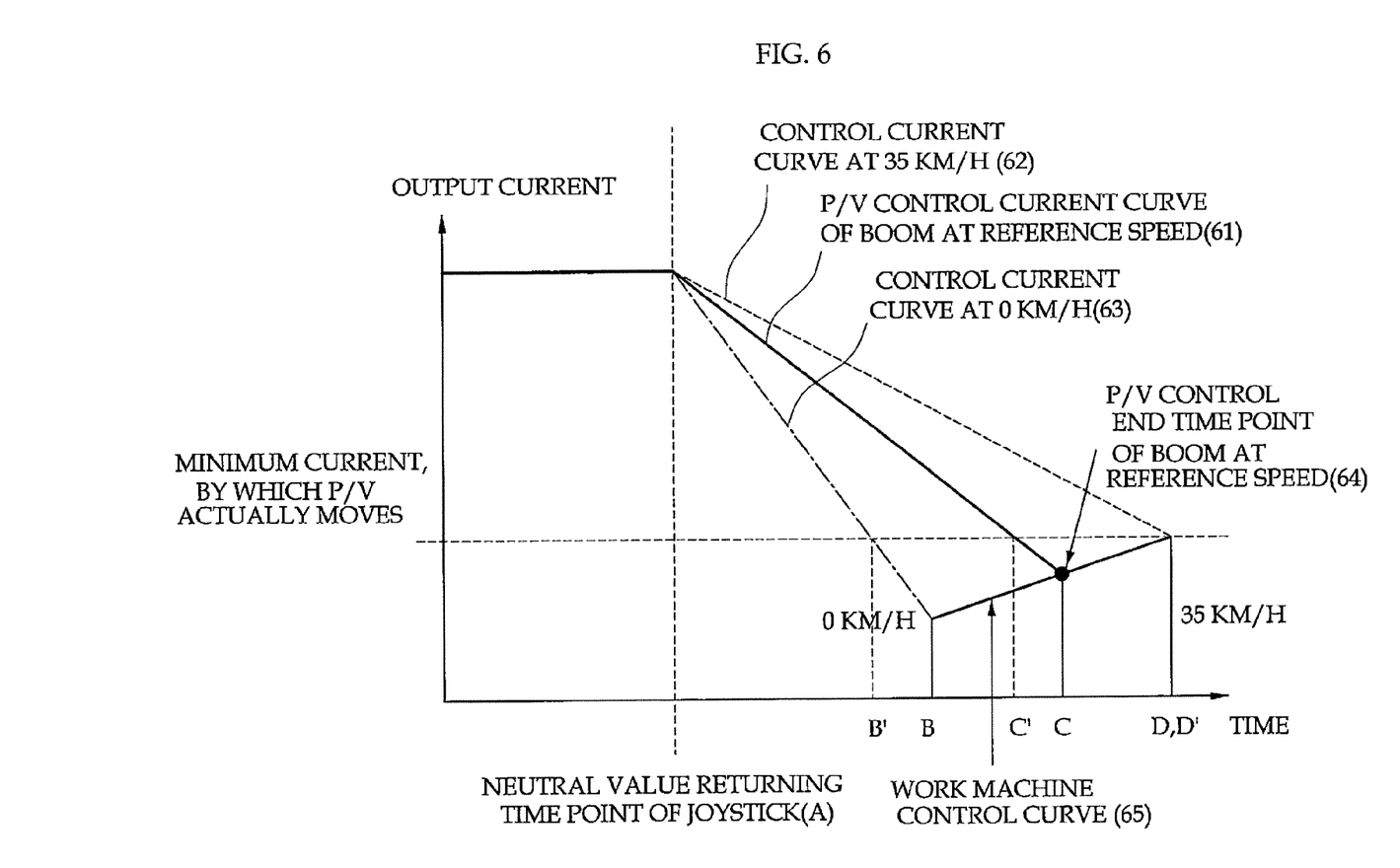
FIG. 6 is a graph illustrating an example of a control of the output current of the apparatus for controlling a work machine according to the exemplary embodiment of the present disclosure.

FIG. 6 is a graph illustrating an example of a control of the output current of the apparatus for controlling a work machine according to the exemplary embodiment of the present disclosure. FIG. 6 is a graph illustrating a time point, at which the joystick returns to the neutral value, in FIG. 5 in detail.

As illustrated in FIG. 6, according to the exemplary embodiment of the present disclosure, a finish point of the joystick is controlled to be linearly changed considering a speed of the work vehicle, so that when the work vehicle is travelling at a low speed, the apparatus accurately and delicately controls the front work machine (the boom and the bucket), but when the work vehicle is travelling at a high speed, the apparatus delays a time point, at which the operation of the front work machine is stopped, thereby decreasing the amount of impact applied to the work vehicle due to a sudden stop of the work machine. This may also be performed by using an acceleration value of the work vehicle. When a speed value is used, the amount of impact may be simply decreased, but when an acceleration value is used, a rollover probability of the work vehicle may be reduced.

Hereinafter, the exemplary embodiment of the present disclosure will be described with reference to FIGS. 3 to 6.

It is premised that a driver operates the front work machine (for example, the boom and the bucket) and performs an earth and sand loading operation while driving the work vehicle (for example, the wheel loader).

In this case, the control unit 330 of the apparatus 300 for controlling a work machine of a work vehicle receives information on a speed of the work vehicle from the speed sensor 310, and determines whether the speed of the work vehicle corresponds to a time point (that is, point "A" in FIG. 6), at which an impact to the work machine is relieved. That is, the control unit 330 determines whether a travelling speed of the work vehicle is a predetermined speed (so called a threshold speed, for example, 35 km/h). When it is determined that the travelling speed of the work vehicle is equal to or larger than the threshold speed, it is determined whether the joysticks 321 and 322 are currently at the time point (for example, point "A in FIG. 6) at which the joysticks 321 and 322 return to the neutral value as illustrated in FIG. 6. When the joysticks 321 and 322 are at the time point, at which the joysticks 321 and 322 return to the neutral value, the control unit 330 delays an output current according to an input of the currently operated joystick as illustrated in FIG. 6.

As illustrated in FIG. 6, the control unit 330 delays an operation of the P/V actually operating the work machine by delaying the output current according to the input of the joysticks 321 and 322 as illustrated in FIG. 6. As illustrated in FIG. 6, the control unit 330 selects so called a "work machine control curve 65 (that is, a control end point change curve of the work machine)" capable of controlling the output current of the joystick according to the travelling speed of the work vehicle. In FIG. 6, for a P/V control current curve 61 of the boom (that is, the work machine of the wheel loader), a P/V control of the boom is actually ended at a point 64 meeting the work machine control curve 65 at time point C. Here, the work machine is actually stopped at time point C', at which the P/V control current curve 61 meets a minimum current value, by which the P/V on a Y-axis actually moves. That is, even though the work machine is actually stopped at time point C, the control unit 330 controls the work machine up to a time point at which the P/V control current curve 61 meets the work machine control curve 65. A deviation of the minimum current value, by which the P/V actually moves, may be generated for each vehicle, so that the aforementioned control is for the purpose of complementing the deviation of the minimum current value.

In the meantime, when the speed of the work vehicle is 0 km, the control of the P/V of the work machine (for example, the boom or the bucket) is ended at time point B, at which a control current curve 63 meets the work machine control curve 65. Further, when the speed of the work vehicle is 35 km, the control of the P/V of the work machine (for example, the boom or the bucket) is ended at time point D, at which a control current curve 62 meets the work machine control curve 65. Accordingly, when the speed of the work vehicle is 35 km, an end time point of the work machine is delayed by a time C-D compared to the control current curve 61 of the general work machine. By contrast, when the speed of the work vehicle is 0 km, an end time point of the work machine is cut by a time B-C compared to the control current curve 61 of the general work machine. In this case, when the speed of the work vehicle is actually 35 km, the work machine is stopped at time point D', at which the control current curve 62 meets the minimum current value, by which the P/V on the Y-axis actually moves. Further, when the speed of the work vehicle is actually 0 km, the work machine is stopped at time point B', at which the control current curve 63 meets the minimum current value, by which the P/V on the Y-axis actually moves.

As described above, according to the exemplary embodiment of the present disclosure, the end time point of the work machine may be advanced or delayed according to the travelling speed of the work vehicle.

By contrast, when the work machine has a smaller value than the minimum current value, by which the P/V on the Y-axis moves, that is, the work machine does not operate, a time point, at which the operation starts, may be controlled by the same method as the aforementioned method. For example, when the work machine has the neutral value and gets out of the neutral value, the control unit 330 starts the control of the P/V at a point, at which point D meets the work machine control curve when the travelling speed is large.

All of the aforementioned constituent elements are not essentially necessary, and some of the aforementioned constituent elements may be omitted.

Figure 7:
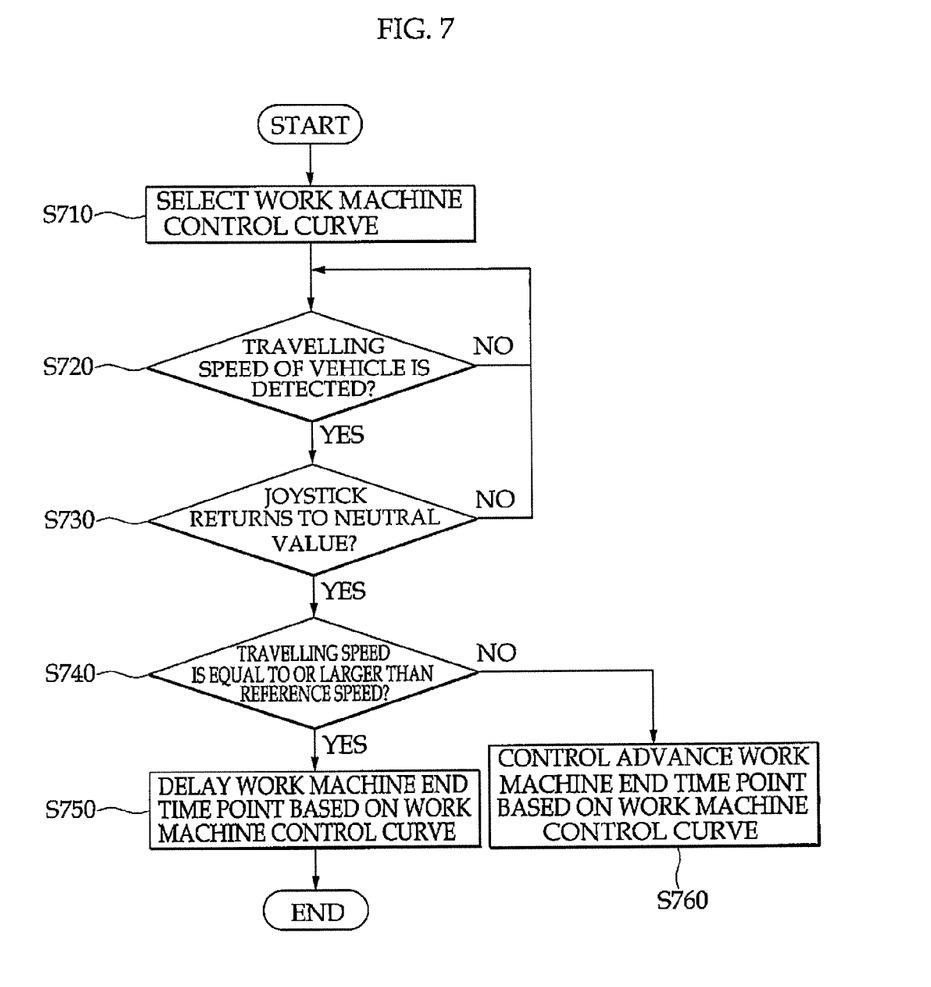
FIG. 7 is a flowchart illustrating an example of a method of operating the apparatus for controlling a work machine according to an exemplary embodiment of the present disclosure.

FIG. 7 is a flowchart illustrating an example of a method of operating the apparatus for controlling a work machine according to an exemplary embodiment of the present disclosure.

Referring to FIG. 7, the control unit 330 selects so called a "work machine control curve (for example, the work machine control curve 65 of FIG. 6) for advancing or delaying a reaction of the work machine according to an input of the joystick (S710). In this case, the "work machine control curve" 65 is predetermined, and a driver may set the control curves having various inclinations.

The control unit 330 detects a travelling speed of the work vehicle through the speed sensor 310 while the work vehicle travels and performs a specific operation (for example, an earth and sand loading operation) (S720). In this case, the control unit 330 detects whether the input of the joystick of the EMCV 320 returns to a neutral value (S730).

When the control unit 330 determines that the detected travelling speed is equal to or larger than a reference speed (a predetermined speed value) (S740), the control unit 330 controls an end time point of the work machine (the boom and/or the bucket) to be delayed based on the "work machine control curve" selected in operation S710 (S750). In the meantime, when the control unit 330 determines that the detected travelling speed is smaller than the reference speed (the predetermined speed value) (S740), the control unit 330 controls an end time point of the work machine (the boom and/or the bucket) to be advanced based on the "work machine control curve" selected in operation S710 (S760).

As described above, according to the exemplary embodiment of the present disclosure, it is possible to adjust an output current curve according to the inputs of the joysticks 321 and 322 of the EMCV 320 according to a travelling speed by recognizing the travelling speed of the work vehicle. Accordingly, according to the exemplary embodiment of the present disclosure, it is possible to accurately and delicately control an operation of the work machine by making the work machine quickly react to the input of the joystick when a travelling speed is smaller than a reference speed. Further, according to the exemplary embodiment of the present disclosure, it is possible to accurately and delicately control an operation of the work machine by delaying time so that the work machine slowly reacts to the input of the joystick when a travelling speed is equal to or larger than a reference speed.

All of the described operations are not essentially required, and some of the operations may be omitted.

The aforementioned method may be implemented by various means. For example, the exemplary embodiments of the present disclosure will be implemented by hardware, firmware, software, or a combination thereof.

When the exemplary embodiments of the present disclosure are implemented by hardware, the method according to the exemplary embodiments of the present disclosure may be implemented in one or more of application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

When the exemplary embodiments of the present disclosure are implemented by firmware or software, the method according to the exemplary embodiments of the present disclosure may be implemented by a form of a module, a procedure, a function, and the like performing the aforementioned functions or operations. A software code may be stored in a memory unit and driven by a processor. The memory unit may be positioned inside or outside the processor to transceive data with the processor by already publicly known various means.

The exemplary embodiments disclosed in the present specification have been described with reference to the accompanying drawings. As described above, the exemplary embodiments illustrated in the respective drawings shall not be limitedly construed, and it may be construed that the exemplary embodiments may be combined by those fully understanding the contents of the present disclosure, and when the exemplary embodiments are combined, some constituent elements may be omitted.

Here, the terms or words used in the present specification and the claims should not be construed as being limited as a commonly used or lexical meaning, and should be construed as a meaning and a concept to conform to the technical spirit disclosed in the present specification.

Therefore, the exemplary embodiments described in the present disclosure and the configurations illustrated in the drawings are just exemplary embodiments of the present disclosure and do not fully represent the technical spirit disclosed in the present disclosure. Therefore, it should be appreciated that there are various equivalents and modified examples capable of substituting them at the time of the filing date of the present disclosure.

The invention claimed is:

1. An apparatus for controlling a work machine of a work vehicle, comprising:
a speed sensor configured to measure a speed of the work vehicle; an electric main controller valve configured to convert an input signal of a joystick into an output current for controlling a proportional valve (P/V) for operating a work machine; and
a control unit configured to receive information on a speed of the work vehicle from the speed sensor, select a work machine control curve, and control the output current of the electric main controller valve based on the speed of the work vehicle and the selected work machine control curve.

2. The apparatus of claim 1, wherein the control unit determines whether the speed of the work vehicle is equal to or larger or smaller than a reference speed, and controls an operation time point or an end time point of the work machine based on the determination.

3. The apparatus of claim 2, wherein when the speed of the work vehicle is equal to or larger than the reference speed, the control unit converts the output current based on the selected work machine control curve and delays a reaction of the work machine compared to a reaction at the reference speed, and when the speed of the work vehicle is smaller than the reference speed, the control unit converts the output current based on the selected work machine control curve and controls the reaction of the work machine to be advanced compared to the reaction at the reference speed.

4. The apparatus of claim 1, wherein the work machine control curve linearly converts the output current of the electric main controller valve, and determines an end time point or an operation time point of the work machine.

5. The apparatus of claim 1, wherein the control unit calculates an acceleration value by using a speed value received through the speed sensor, and controls the output current of the electric main controller valve based on the acceleration valve and the selected work machine control curve.

6. A method of controlling a work machine of a work vehicle, comprising:
detecting a travelling speed of the work vehicle;
detecting whether an input of a joystick of an electric main controller valve is converted into an operation value or returns to a neutral value;
comparing the detected travelling speed with a reference speed;
selecting a work machine control curve for controlling an end time point or an operation time point of the work machine; and controlling the end time point or the operation time point of the work machine.

7. The method of claim 6, wherein the work machine control curve linearly converts the output current of the electric main controller valve, and determines an end time point or an operation time point of the work machine.

* * * * *